United States Patent
Langhammer et al.

(10) Patent No.: US 7,752,407 B1
(45) Date of Patent: Jul. 6, 2010

(54) SECURITY RAM BLOCK

(75) Inventors: Martin Langhammer, Salisbury Wiltshire (GB); Klaus Engelhardt, Olching (DE)

(73) Assignee: Altera Corporation, San Jose, CA (US)

( * ) Notice: Subject to any disclaimer, the term of this patent is extended or adjusted under 35 U.S.C. 154(b) by 794 days.

(21) Appl. No.: 11/517,689

(22) Filed: Sep. 7, 2006

(51) Int. Cl.
*G06F 12/14* (2006.01)

(52) U.S. Cl. ............... 711/164; 711/163; 711/E19.092

(58) Field of Classification Search .............. None
See application file for complete search history.

(56) References Cited

U.S. PATENT DOCUMENTS 5,455,862 A * 10/1995 Hoskinson .................. 380/262

* cited by examiner

*Primary Examiner*—Reginald G Bragdon
*Assistant Examiner*—Eric Loonan
(74) *Attorney, Agent, or Firm*—Townsend and Townsend and Crew LLP

(57) ABSTRACT

Circuits, methods, and apparatus for storing application data, keys, authorization codes, or other information in a volatile memory on an FPGA. To prevent erasure of the stored information when power to the FPGA is removed, or when the FPGA is configured, or when applications are installed, a battery powers the memory. The battery power may be interrupted, for example if a tamper is detected, in order to erase the contents of the memory. Access to data stored in memory may also be limited by using authorization codes or encryption. For example, an application may only be granted access if it provides the correct authorization code. Alternately, an application may encrypt data with a key before it is stored. Only an application with the correct key can make further use of the data.

23 Claims, 19 Drawing Sheets

SECURITY RAM BLOCK

BACKGROUND

The present invention relates generally to storing data on an integrated circuit and more particularly to protecting data stored in a battery powered memory on a field programmable gate array (FPGA).

The circuit complexity and the tasks performed by integrated circuits such as field programmable gate arrays have greatly increased the last few years. Highly sophisticated software, or applications, run on programmable logic elements that are configured to perform intricate user-defined functions.

Often these applications need to store data in a memory, for example, an application may store data at different times for later use. Other important data such as chip identification, license information, and encryption keys may need to be stored. Unfortunately, if power is removed from the memory, this data is lost unless the memory is nonvolatile.

But nonvolatile memory typically requires processing that is either not compatible with processing technologies used to manufacture FPGAs or uses extra processing steps that greatly increase device costs. Also, in many situations, the security of the data stored in memory is important, so it is desirable to quickly erase it if a tamper is detected. Unfortunately, it is difficult to quickly erase nonvolatile memory. Further, data stored in a nonvolatile memory can be discovered through reverse engineering.

To protect this data, it is important to also limit access to it, such that the data may not be stolen or copied by a nefarious user or application. For example, a configuration design may be protected by encrypting it with a key. If this key is stored in memory for use during decryption, it is desirable to protect and limit access to this key.

Thus, what is needed are circuits, methods, and apparatus that provide a memory for an FPGA that retains data when power to the FPGA is removed, but is compatible with conventional FPGA manufacturing processes and can quickly be erased in the event of a tamper or other unauthorized event. Also, it is desirable to provide further protection by limiting access to data stored in the memory.

SUMMARY

Accordingly, embodiments of the present invention provide circuits, methods, and apparatus for storing application data, keys, authorization codes, or other information in a memory on an FPGA. An exemplary embodiment of the present invention provides an FPGA that stores this data in an on-chip volatile memory. A battery powers the memory to prevent erasure of the stored information when power to the FPGA is removed. In various embodiments the battery is always the source of power for the memory, in other embodiments one or more other power supplies can be switched in to replace the battery as the source of power to the memory, for example to extend battery life.

In various embodiments of the present invention, the power to the memory may be interrupted in order to erase the contents of the memory. For example, if a tamper or unauthorized configuration bitstream is attempted, power to the memory is cut, thereby erasing the memory. In one exemplary embodiment, a message authentication code (MAC) is used to verify a configuration bitstream. The MAC removes power from the memory if the received bitstream is not verified.

Various embodiments of the present invention also limit access to data stored in memory. Typically, read access is limited, though write access may also be limited, particularly where data is being overwritten. In a specific embodiment of the present invention, access is limited by using authorization codes. An application is only granted access if it provides the correct authorization code, or an access code and authorization codes stored in the memory have a predefined function relationship. Another embodiment of the present invention encrypts data with a key before it is stored. Only an application with the correct key can make use of the data. Embodiments of the present invention may incorporate one or more of these or the other features described herein.

In one embodiment, the present invention provides an apparatus for securely storing data. The apparatus includes a memory core that contains a secure portion allocated to secure data storage, and a control circuit configured to control data written to and read from the secure portion of the memory core, and is adapted to prevent changes to data stored in the secure portion during reconfiguration operations of the memory, such as when an application is configured during a software application installation process which involves data read from and stored to the memory core.

A better understanding of the nature and advantages of the present invention may be gained with reference to the following detailed description and the accompanying drawings.

BRIEF DESCRIPTION OF THE DRAWINGS

FIG. 3A is a block diagram illustrating the storing of an encrypted configuration bitstream and decryption key according to an embodiment of the present invention, while

FIG. 4A is a flowchart illustrating a method of encrypting a configuration bitstream and storing a key and other parameters in a security RAM according to an embodiment of the present invention, while

DESCRIPTION OF EXEMPLARY EMBODIMENTS

Figure 1:
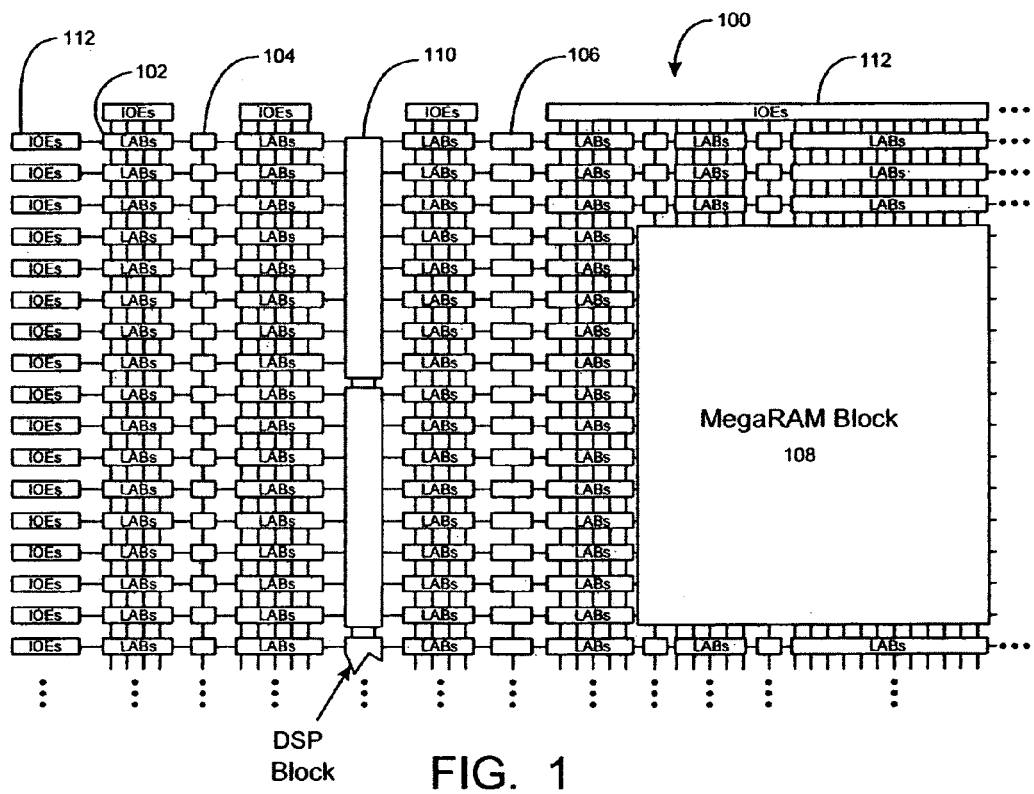
FIG. 1 is a simplified block diagram of a programmable logic device that is improved by incorporating embodiments of the present invention.

FIG. 1 is a simplified partial block diagram of an exemplary high-density programmable logic device 100 wherein techniques according to the present invention can be utilized. PLD 100 includes a two-dimensional array of programmable logic array blocks (or LABs) 102 that are interconnected by a network of column and row interconnections of varying length and speed. LABs 102 include multiple (e.g., 10) logic elements (or LEs), an LE being a small unit of logic that provides for efficient implementation of user defined logic functions.

PLD 100 also includes a distributed memory structure including RAM blocks of varying sizes provided throughout the array. The RAM blocks include, for example, 512 bit blocks 104, 4K blocks 106, and an M-Block 108 providing 512K bits of RAM. These memory blocks may also include shift registers and FIFO buffers. PLD 100 further includes digital signal processing (DSP) blocks 110 that can implement, for example, multipliers with add or subtract features.

It is to be understood that PLD 100 is described herein for illustrative purposes only and that the present invention can be implemented in many different types of PLDs, FPGAs, and the other types of digital integrated circuits.

Figure 2:
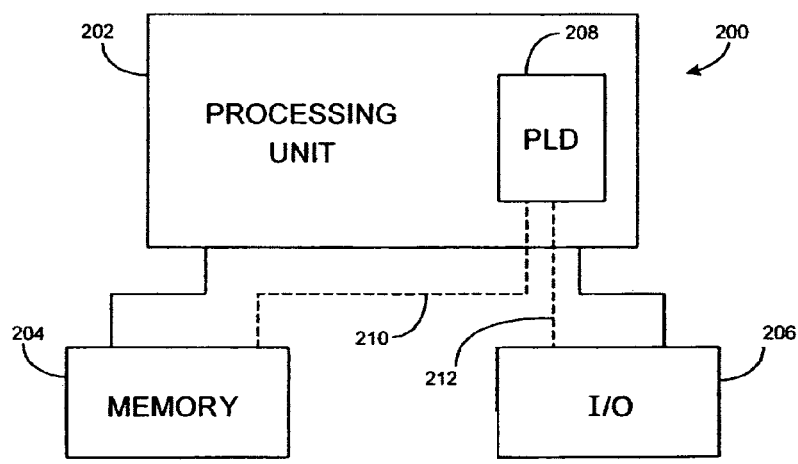
FIG. 2 is a block diagram of an electronic system that is improved by incorporating embodiments of the present invention.

While PLDs of the type shown in FIG. 1 provide many of the resources required to implement system level solutions, the present invention can also benefit systems wherein a PLD is one of several components. FIG. 2 shows a block diagram of an exemplary digital system 200, within which the present invention may be embodied. System 200 can be a programmed digital computer system, digital signal processing system, specialized digital switching network, or other processing system. Moreover, such systems may be designed for a wide variety of applications such as telecommunications systems, automotive systems, control systems, consumer electronics, personal computers, Internet communications and networking, and others. Further, system 200 may be provided on a single board, on multiple boards, or within multiple enclosures.

System 200 includes a processing unit 202, a memory unit 204 and an I/O unit 206 interconnected together by one or more buses. According to this exemplary embodiment, a programmable logic device (PLD) 208 is embedded in processing unit 202. PLD 208 may serve many different purposes within the system in FIG. 2. PLD 208 can, for example, be a logical building block of processing unit 202, supporting its internal and external operations. PLD 208 is programmed to implement the logical functions necessary to carry on its particular role in system operation. PLD 208 may be specially coupled to memory 204 through connection 210 and to I/O unit 206 through connection 212.

Processing unit 202 may direct data to an appropriate system component for processing or storage, execute a program stored in memory 204 or receive and transmit data via I/O unit 206, or other similar function. Processing unit 202 can be a central processing unit (CPU), microprocessor, floating point coprocessor, graphics coprocessor, hardware controller, microcontroller, programmable logic device programmed for use as a controller, network controller, and the like. Furthermore, in many embodiments, there is often no need for a CPU.

For example, instead of a CPU, one or more PLD 208 can control the logical operations of the system. In an embodiment, PLD 208 acts as a reconfigurable processor, which can be reprogrammed as needed to handle a particular computing task. Alternately, programmable logic device 208 may itself include an embedded microprocessor. Memory unit 204 may be a random access memory (RAM), read only memory (ROM), fixed or flexible disk media, PC Card flash disk memory, tape, or any other storage means, or any combination of these storage means.

Figure 3A:
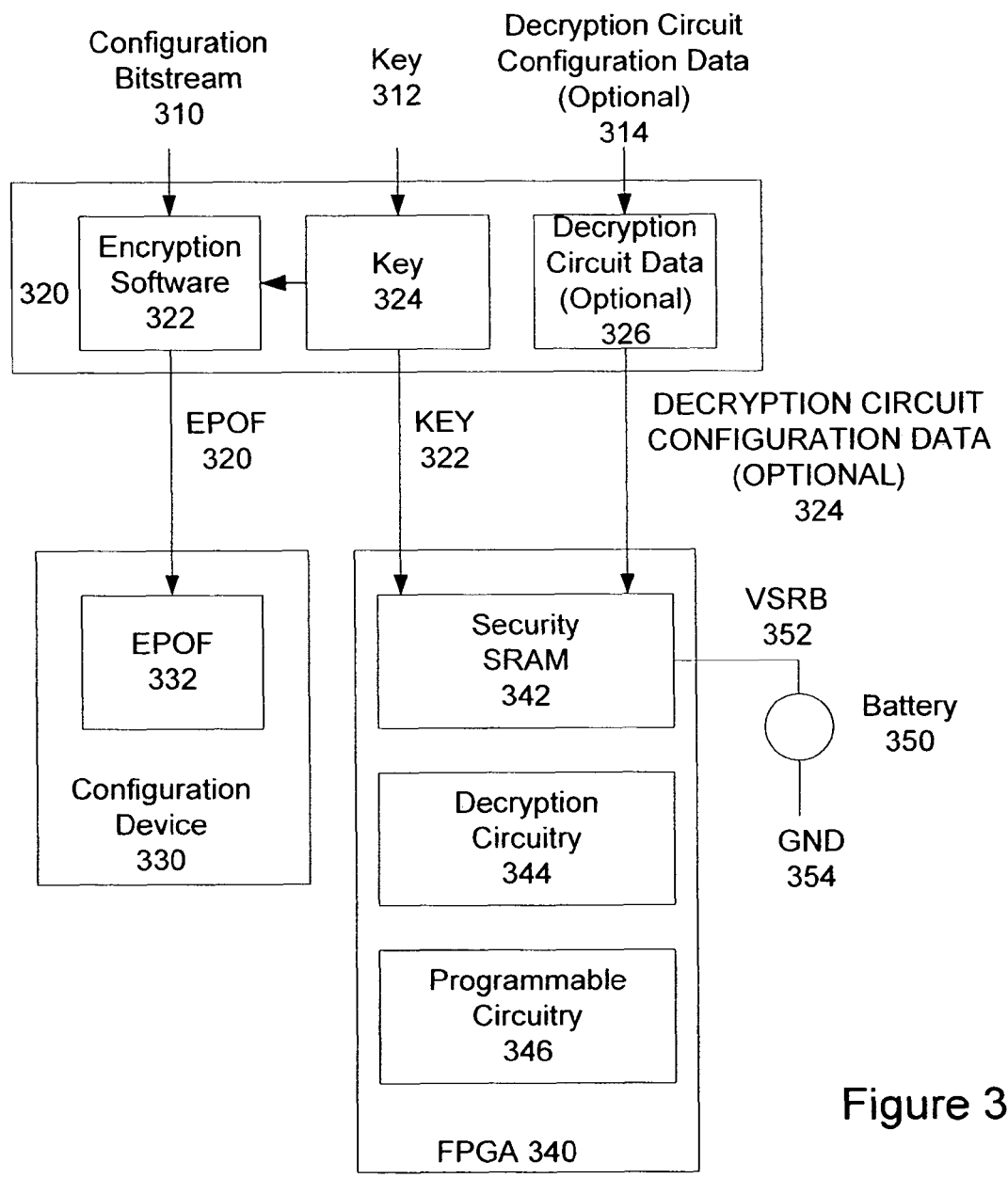

FIG. 3A is a block diagram illustrating a method of storing of an encrypted configuration bitstream and decryption key according to an embodiment of the present invention. This figure includes software modules and hardware interface 320, configuration device 330, FPGA 340, and battery 350. In various embodiments of the present invention, the configuration device 330 may be included as part of the FPGA 340. For example, the configuration device 330 may be a memory on the FPGA 340. This figure, as with the other included figures, is shown for illustrative purposes and does not limit either the possible embodiments of the present invention or the claims.

The software modules and hardware interface 320 include an encryption software module 322, key software module 324, and decryption circuit data module 326. These software modules use one or more hardware interfaces for transferring data to the FPGA 340 and optional configuration device 330. The FPGA 340 includes a security SRAM 342, decryption circuitry 344, and other programmable circuitry 346.

A key 312 is received or otherwise generated by the key software module 324, which provides it as key 322 to the security SRAM 342 on the FPGA 340 and to the encryption software module 322. A configuration bitstream 310 is received by encryption software module 322, which uses the key 324 to generate an encrypted configuration bitstream or encrypted program object file, EPOF 320, which is provided to the configuration device 330. Decryption circuit configuration data 314 may be optionally received by decryption circuit data software module 326, which provides data for storage in the security SRAM 342. This decryption circuit configuration data may include a decryption circuit configuration bitstream, decryption circuit parameters, such as the number of rounds, substitution box entries, and other parameters, or both.

The decryption circuitry 344 may be a fixed decryption circuit, that is, a hard logic or hardwired circuit. The decryption circuitry 344 may alternately be configured from programmable logic or other configurable circuits, or it may include a combination of these techniques. These logic elements can be configured by a decryption circuit configuration bitstream that is part of the decryption circuit configuration data 326. When a decryption circuit 344 is to be configured, decryption circuit configuration data 326 is provided and stored in the security SRAM 342.

In various embodiments, standard or conventional encryption methods and circuits such as triple-DES (3-DES) or AES may be used. Alternately, proprietary encryption circuits may be used. Both conventional and proprietary algorithms may be defined by various encryption algorithm parameters, which may also be part of the decryption circuit configuration data 324 stored on the FPGA 340. For example, when using otherwise standard encryption methods, variations such as the number of rounds may be defined by encryption algorithm parameters. In various embodiments of the present invention where the decryption circuit is fixed or hardwired, these encryption parameters may also be fixed such that encryption algorithm parameters are not needed.

In a typical embodiment of the present invention, the security SRAM 342 is a volatile memory. In various embodiments of the present invention, the key 322, and optionally the decryption circuit configuration data 326, is retained in the volatile memory 342.

In one embodiment, the security SRAM 342 may include other circuits, such as an access control circuit, described further below with respect to FIG. 12, that may be employed to prevent unauthorized access to the security SRAM 342, and may utilize keys or other security measures such as passwords to provide a secure communication interface. Such access control circuits allow data to be loaded into or retrieved from, or not loaded into or retrieved from circuits and applications disposed outside the PLD 208, or resident in the PLD 208. For example, such access control circuits can control data being loaded (i) directly into security SRAM 342 from outside the PLD 208, (ii) from the application running in the PLD 208, generate the data and load it onto the security SRAM 342, or (iii) employ an external process to work with the application in the PLD 208 to load data onto security SRAM 342 (i.e. public key exchange). Such control circuits could operate in a power loss situation or during application loading and/or configuration. In other embodiments, such control circuit may control data retention using (i) a hard switch, such as a fuse, (ii) a soft switch, such as a RAM bit on the PLD 208, and/or (iii) by a memory location inside the security SRAM 342, as described herein.

To ensure that this data is not lost when device power is removed, a backup battery 350 may be used. In this specific example, a battery 350 powers the memory or security SRAM 342 by supplying a voltage VSRB on line 352 with respect to ground on line 354. This battery 350 may be separate from the FPGA 340, or it may be included with the FPGA 340 as part of its packaging. For example, the FPGA 340 may be packaged in a ball grid array package that also includes the battery 350. Alternately, the FPGA 340 and battery may be placed on a common substrate that is then packaged.

The previous activities typically take place at a manufacturing facility, such as an integrated circuit or an original equipment manufacturer's facility. The following activities typically occur once the FPGA 340 is deployed in the field or otherwise used in an application. These activities often take place following a power-up or a power recycle.

Figure 3B:
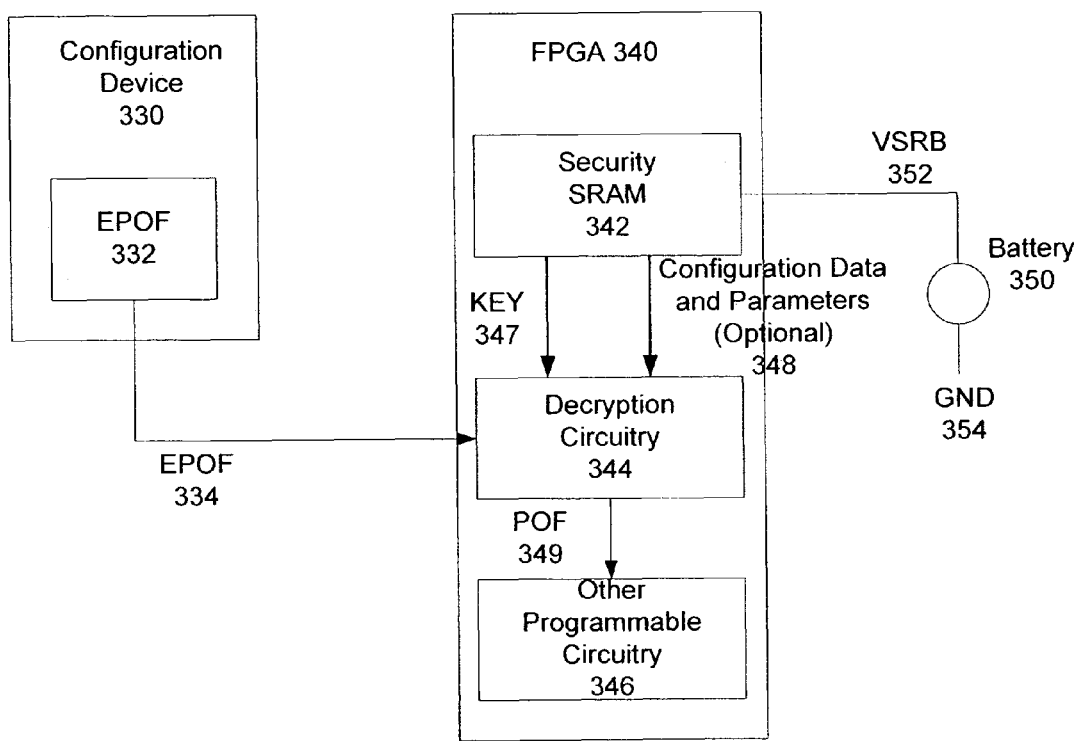
FIG. 3B illustrates the decryption of an encrypted bitstream and configuration of an FPGA according to an embodiment of the present invention.

FIG. 3B illustrates the decryption of an encrypted bitstream and configuration of an FPGA according to an embodiment of the present invention. This block diagram includes a configuration device 330, FPGA 340, and battery 350. Again, the configuration device 330 may be part of the FPGA 340. The battery 350 powers the security SRAM 342, such that its contents are not lost when the other power supply voltages connected to the FPGA 340 are removed.

Again, the decryption circuitry 344 is typically fixed or hard logic. Optionally, the decryption circuit 344 may be to some degree configurable. For example, the decryption circuitry 344 may include hard logic with additional programmable logic elements, or it may be completely programmable. If the decryption circuitry 344 needs to be configured to some extent, a decryption circuit configuration bitstream is received from the security SRAM 342 as part of the configuration data and parameters 348. If the various parameters of the decryption circuitry 344 are to be programmed, these parameters are received by the decryption circuitry 344 by the security SRAM 342. This information may include the number of rounds of decryption to be used, S-Box entries, permutation settings, and other information. Note that the decryption circuitry 344 needs to be configured before the encrypted configuration bitstream for the rest of the device can be decrypted.

Once the decryption circuitry 344 is configured and any required parameters are received, the key 347 is received from the security SRAM 342. The configuration data for the rest of the circuitry, specifically the EPOF 334, is received by the decryption circuitry 344. The decryption circuitry 344 decrypts the encrypted program object file 334 and generates a decrypted program object file 349, which is then used to configure the other programmable circuitry 346 on the FPGA 340.

Figure 4A:
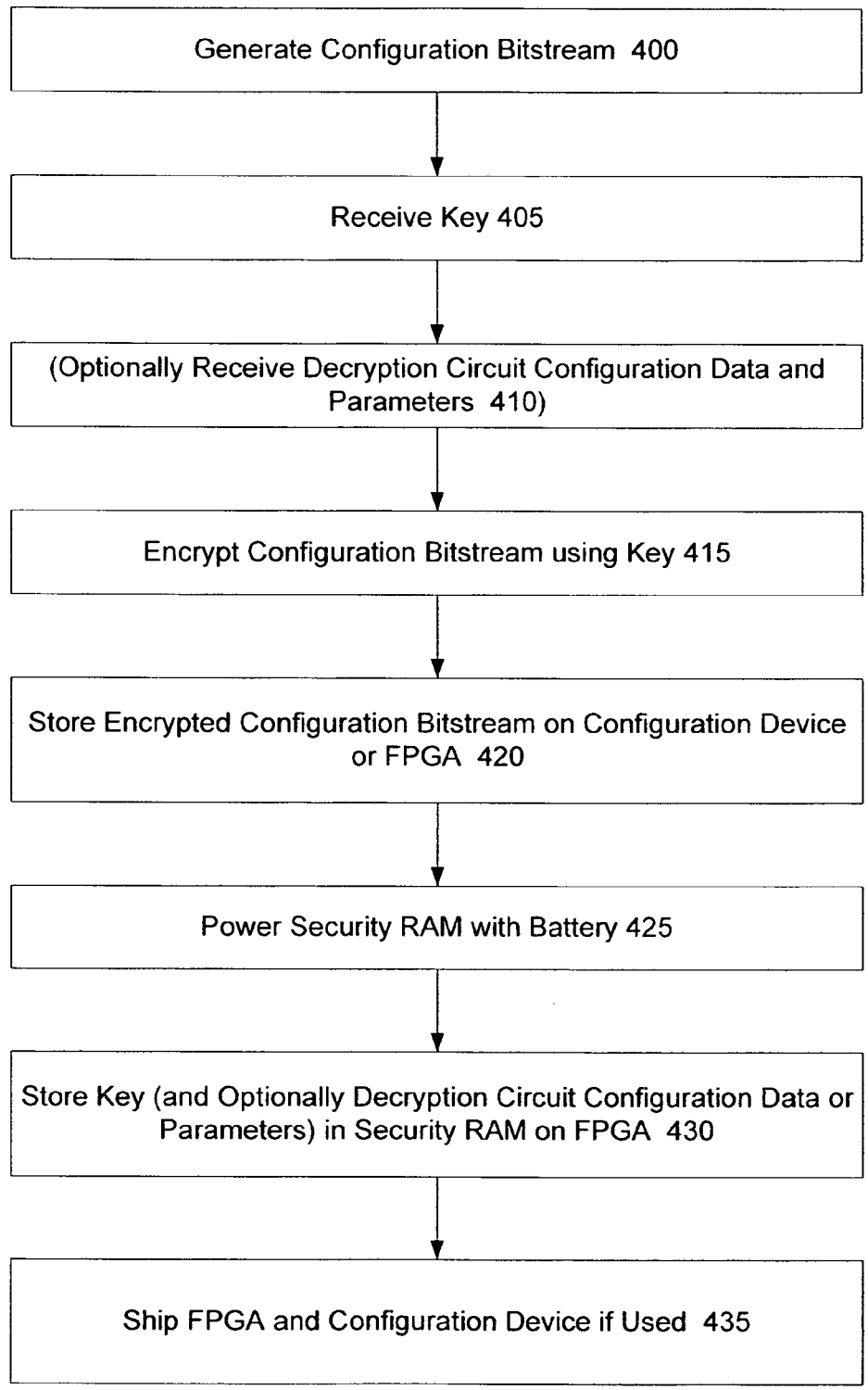

FIG. 4A is a flowchart illustrating a method of encrypting a configuration bitstream and storing a key and other parameters in a security RAM according to an embodiment of the present invention. In step 400, a configuration bitstream is generated, for example by using a hardware design program. In step 405, a key is received. Optionally, parameters and configuration information for the decryption circuitry, to the extent they are used, are received in step 410. In step 415, the configuration bitstream is encrypted using the key. This encrypted configuration bitstream can be stored, either on a configuration device or FPGA in step 420.

In step 425, a security RAM is powered with the battery to protect the contents of the security RAM that about to be loaded. In step 430, the key and optional decryption circuit parameters are stored in the security SRAM. At this point, the FPGA, and configuration device if used, can be shipped in step 435 in order be placed into service.

The steps shown in FIG. 4A are typically done at an integrated circuit or original equipment manufacturer's location. The steps in FIG. 4B are typically carried out later, for instance during testing, or once the device is deployed in a user's application.

Figure 4B:
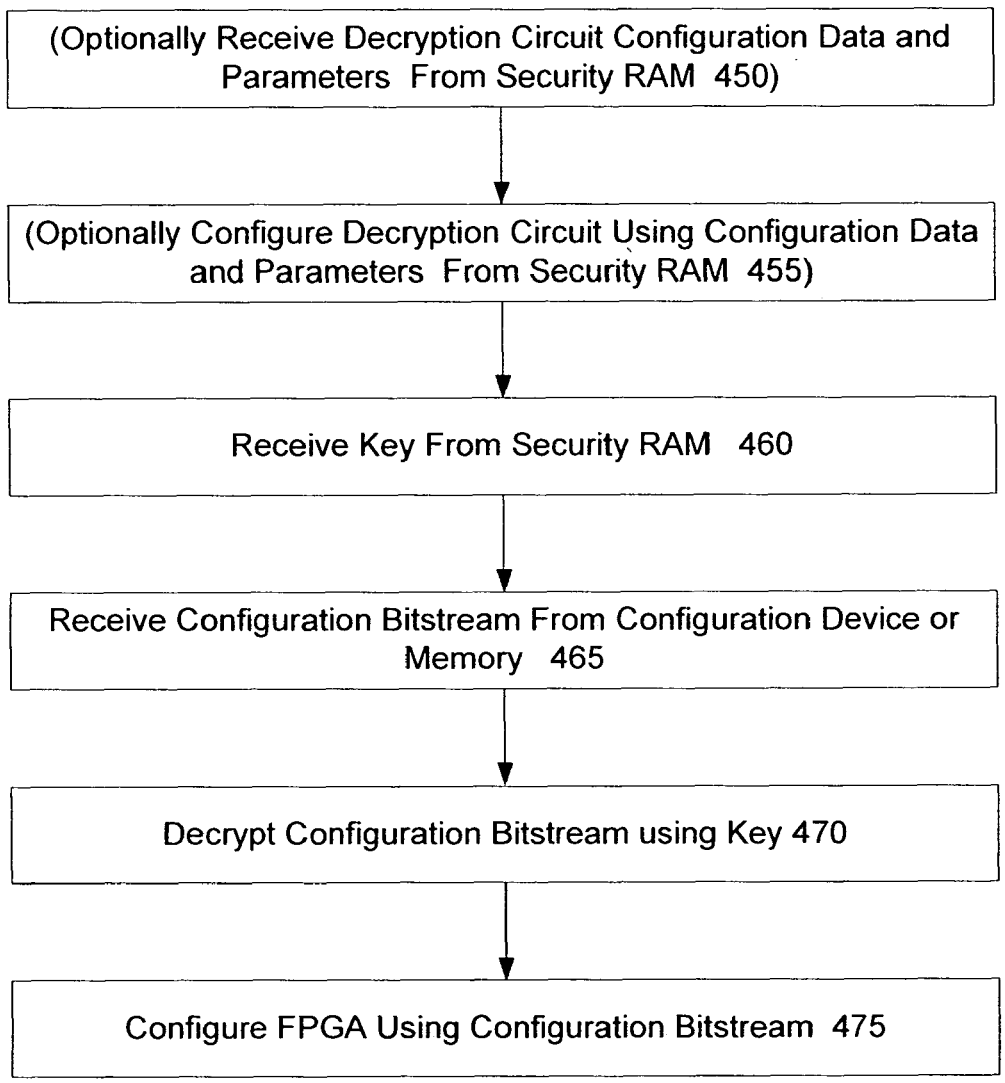
FIG. 4B is a flowchart illustrating a method of decrypting an encrypted configuration bitstream and configuring an FPGA according to an embodiment of the present invention.

FIG. 4B is a flowchart illustrating a method of decrypting an encrypted configuration bitstream and configuring an FPGA according to an embodiment of the present invention. Following a power up or other appropriate event, the decryption circuitry parameters and configuration data is received (when used) from the security RAM in step 450. The decryption circuit is configured using the configuration bitstream and parameters received from the security RAM in step 455. In step 460, a key is received from the security RAM by the decryption circuit.

The configuration bitstream, which was previously encrypted, is received from the configuration device or memory locations on the FPGA, in step 465. In step 470, the configuration bitstream is decrypted using the key. In step 475, the FPGA is configured using the newly decrypted configuration bitstream.

Figure 5:
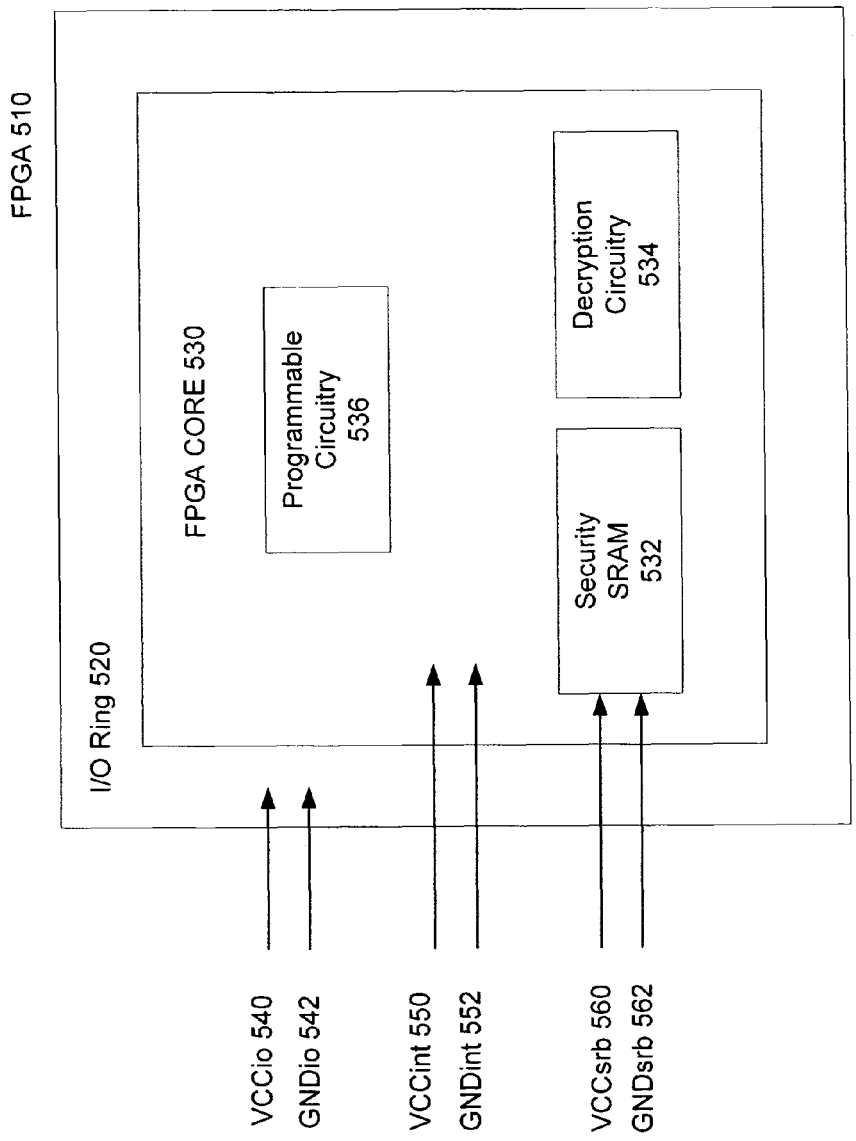
FIG. 5 illustrates a method of powering a security RAM according to an embodiment of the present invention.

FIG. 5 illustrates a method of powering a security RAM according to an embodiment of the present invention. In this particular example, the FPGA 510 is broken into input/output circuitry forming a ring 520, and a core 530, which includes a security SRAM 532, decryption circuitry 534, and other programmable circuitry 536.

In this particular example, the input output circuitry 520, core 530, and security SRAM 532 are powered individually. Specifically, VCCio 540 and GNDio 542 power the I/O ring 520, the FPGA core 530 is powered by VCCint 550 and GNDint 552, while the security SRAM 530 is powered by VCCsrb 560 and GNDsrb 562. It will to be appreciated by one skilled in the art that the more or fewer power supplies connected to different circuitry portions may be used.

Figure 6:
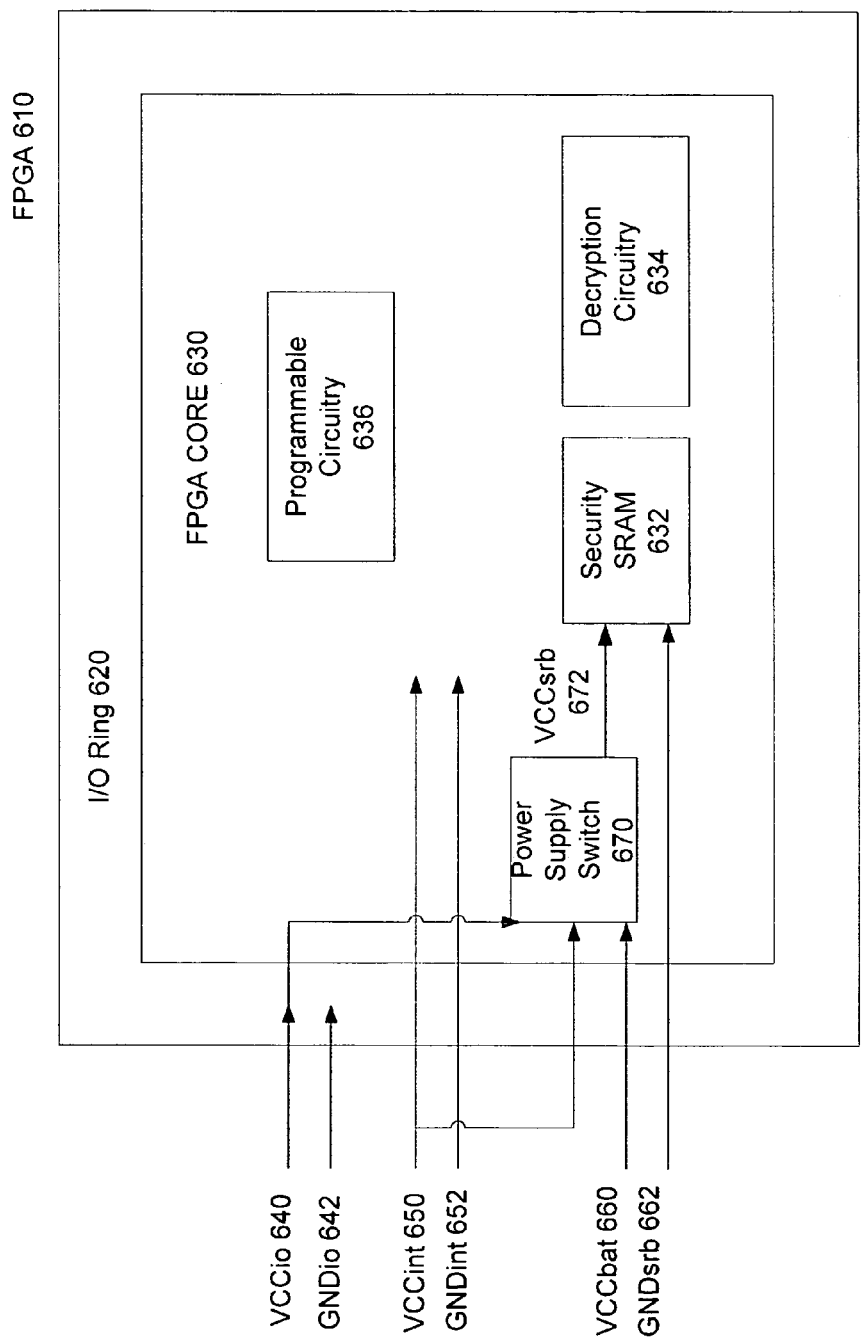
FIG. 6 illustrates another method of powering a security RAM according to an embodiment of the present invention.

FIG. 6 illustrates another method of powering a security RAM according to an embodiment of the present invention. In this figure, as compared to FIG. 5, a power supply switch has been added. Specifically, this figure includes an FPGA 610, which includes an input/output ring, I/O ring 620, and an FPGA core including a security SRAM 632, decryption circuitry 634, other programmable circuitry 636, and the power supply switch 670. In this example, the power supply switch 670 is included on the FPGA 610. In other embodiments of the present invention, the power supply switch 670 may be separate and not included on the FPGA 610.

As before, the I/O ring 620, FPGA core 630, and security SRAM 632 receive separate power supplies. Specifically, the VCCio 640 and GNDio 642 power the I/O ring 620, while the FPGA VCCint 650, and GNDint 662 power core 630.

The security SRAM is powered by the output of the power supply switch 670, which provides VCCsrb 670, and GNDsrb 662. The power supply switch 670, in this example, receives VCCio 640, VCCint 650, and VCCbat 670. VCCbat 660 may be provided by a battery, such as the battery 350 in FIG. 3. The power supply switch 670 selects one of the voltages at its input and provides VCCsrb 672 to the security SRAM 632.

In various embodiments of the present invention, the power supply switch 670 may receive these or other power supplies. In various embodiments, the power supply switch 670 may use different algorithms for selecting which of these power supplies is provided as VCCsrb 672 to the security SRAM 632. Also, the power supplies switch 670 may perform additional functions such as power supply regulation or filtering. That is, the power supply switch 670 may use one or more of the applied input voltages to generate VCCsrb 672, rather than simply connecting a selected applied voltage to the security SRAM 632.

In a specific embodiment, when VCCbat 660 is the only active power supply received by the power supply switch 670, that voltage is used to generate VCCsrb 672. However, if one of the other power supplies received by the power supply switch 670 is active, that is, above a certain voltage threshold, VCCbat 660 is not used such that actual battery life is extended. If more than one other power supply is active, for example both VCCio 640 and VCCint 650 are active, the quieter of the two supplies, typically VCCint 650, is used to generate VCCsrb 672, though in other embodiments, the noisier supply is used. In another embodiment, if VCCbat 660 is active, that power supply is used by the power supply switch 670 to generate VCCsrb 672.

Again, the security SRAM 632 is typically a volatile memory. Thus, if its power supplies are removed, the contents of the memory are lost. This is useful in applications where the contents of the security SRAM 632 need to be erased quickly due to a tampering or other unauthorized event. When the security SRAM 632 is formed using a volatile memory, such erasure can occur by interrupting the power supply connection to the security SRAM 632.

Figure 7:
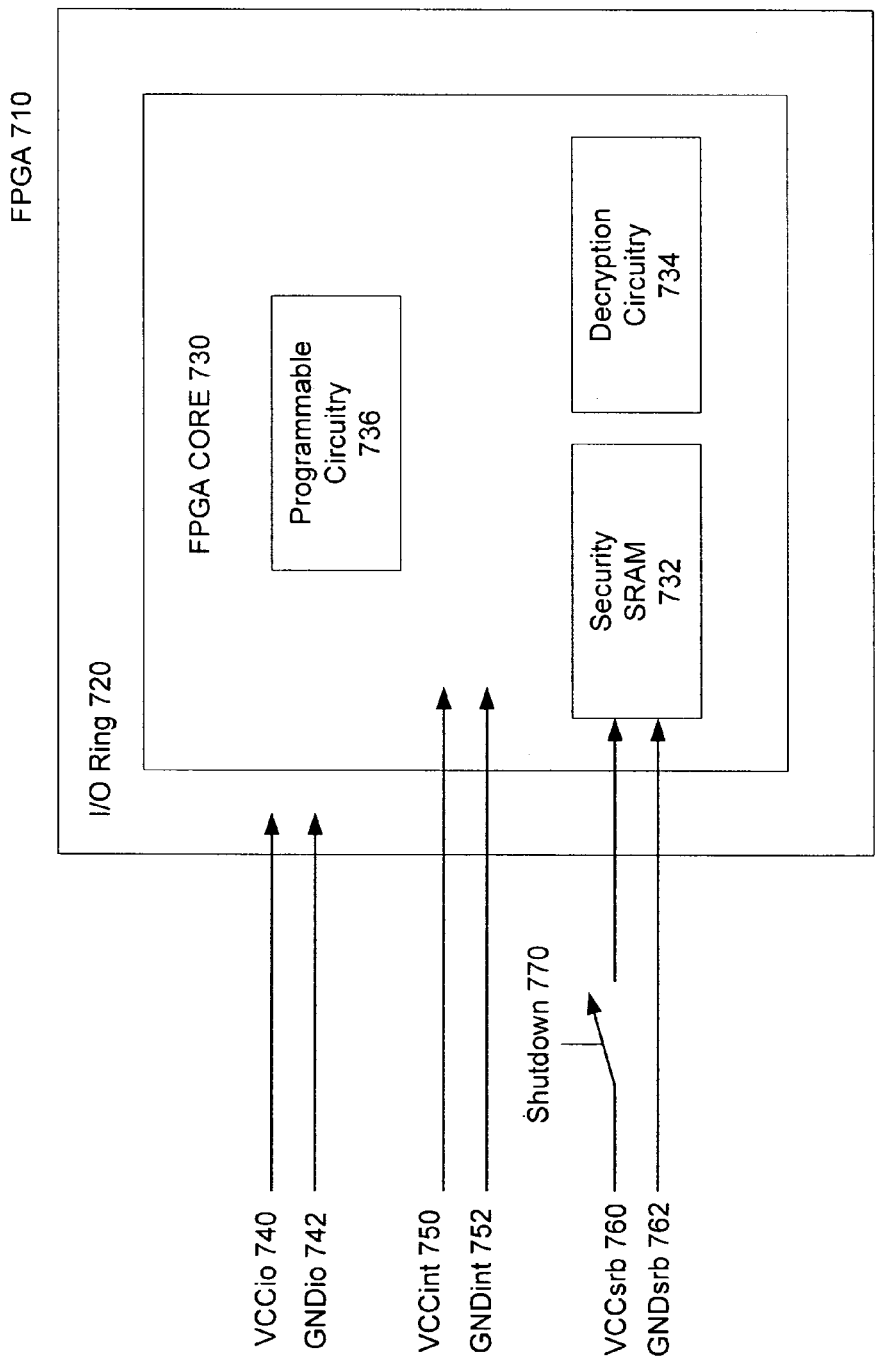
FIG. 7 illustrates a method of powering a security RAM while utilizing a shutdown switch according to an embodiment of the present invention.

FIG. 7 illustrates a method of powering a security RAM while utilizing a shutdown switch according to an embodiment of the present invention. This figure includes an FPGA 710 divided into an input/output ring 720 and FPGA core 730. The FPGA core 730 includes a security SRAM 732, decryption circuitry 734, and other programmable circuitry 736. VCCio 740 and GNDio 742 power the I/O ring 720, while VCCint 750 and GNDint 752 power the FPGA core 730

VCCsrb 760 and GNDsrb 762 power the security SRAM. The VCCsrb 760 power supply can be disconnected from the security SRAM 732 by shutdown switch 770. The shutdown switch 770 may be formed on the FPGA 710. Alternately, the shutdown switch 770 may be off-chip. The shutdown switch 770 may be controlled by circuitry that detects a tamper or other unauthorized event.

One such unauthorized event is the loading of an unauthorized configuration bitstream. Accordingly, the configuration bitstream that is used may be verified. If the configuration bitstream is invalid, the power supply to the security SRAM 72 is interrupted and its contents are lost.

Figure 8:
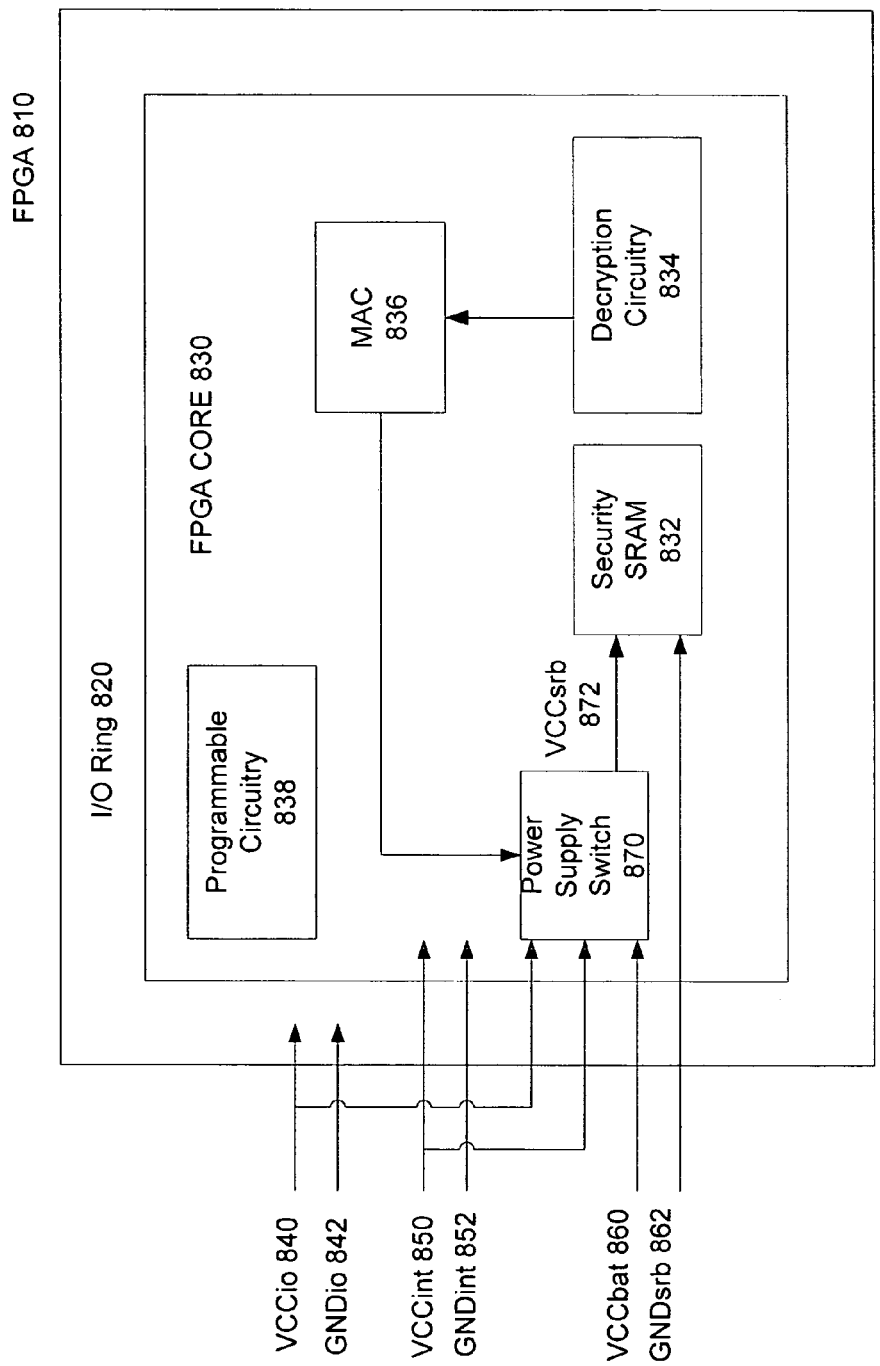
FIG. 8 illustrates a method of powering a security RAM while utilizing a shutdown switch controlled by a message authentication code according to an embodiment of the present invention.

The power supply switch 670 in FIG. 6 and the shutdown switch 770 in FIG. 7 may be incorporated into a single unit, shown in FIG. 8 as the power supplies switch 870. The power supply switch 870 selects among different input voltages to provide VCCsrb 872, and also interrupts that power supply when instructed by message authentication code 832.

FIG. 8 illustrates a method of powering a security RAM while utilizing a shutdown switch controlled by a method authentication code according to an embodiment of the present invention. This figure includes an FPGA 810, which includes an I/O ring 820 and FPGA core 830. The FPGA core 830 includes a security SRAM 832, decryption circuitry 834, message authentication code 836, other programmable circuitry 838, and a power supply switch 870.

In this example, VCCio 840 and GNDio 842 power the I/O ring 820, the FPGA core 830 is powered by VCCint 850 and GNDint 852, while VCCsrb 872 and GNDsrb 872 power the security SRAM 832. The power supply switch 870 generates VCCsrb 872. The power supply switch 870, in this example, receives VCCio 840, VCCint 850, and VCCbat 860 as inputs. In embodiments of the present invention, the power supply switch 870 may receive these or other voltages. The power supply switch 870 may select among the received voltages as described above with regards to power supply switch 670.

After the decryption circuitry 834 decrypts the configuration bitstream, the configuration bitstream may be processed by a message authentication code 836, which verifies the configuration bitstream. If the configuration bitstream is invalid, the power supply switch 870 is instructed to remove power from the security SRAM 832. In this way, when an unauthorized configuration bitstream is used, the contents of the security SRAM 832 are lost. On-chip circuitry can track the loss of the contents of the security SRAM and disable the FPGA 810 appropriately.

Figure 9:
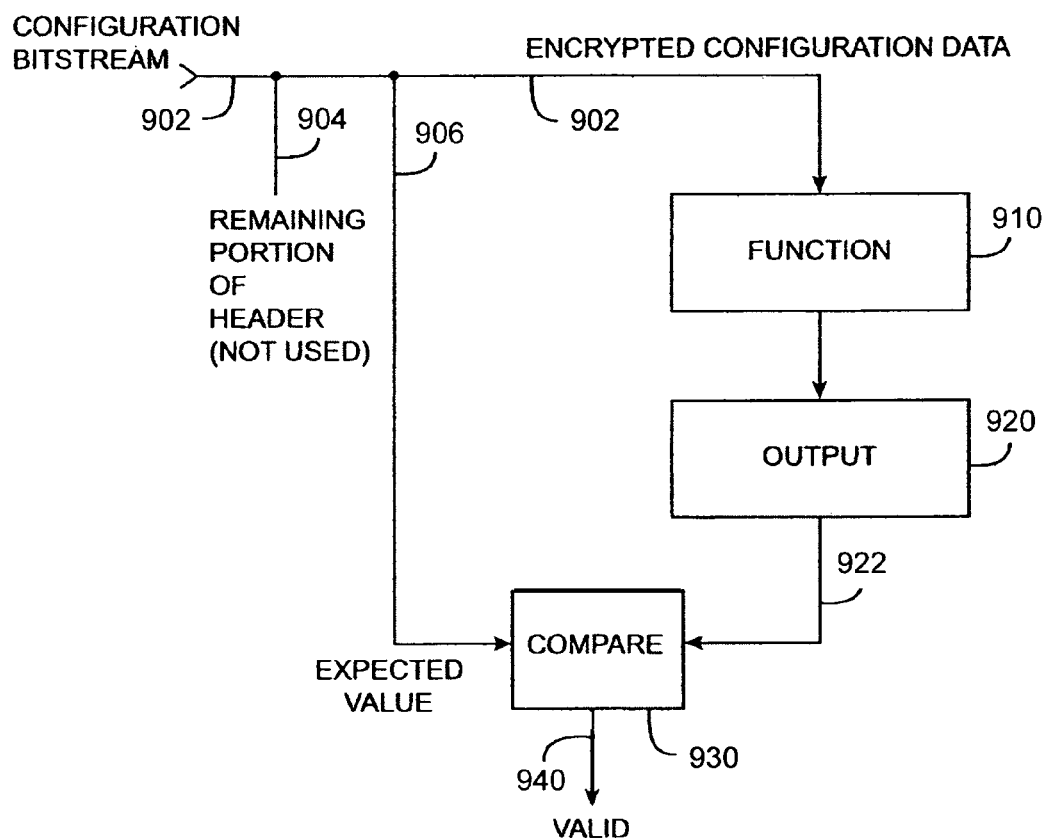
FIG. 9 illustrates a method of generating a configuration bitstream verification signal to control a security RAM shutdown switch according to an embodiment of the present invention.

FIG. 9 illustrates a method of generating a configuration bitstream verification signal to control a power supply shutdown switch according to an embodiment of the present invention. Message authentication code 836 in FIG. 8 may use this method. This configuration bitstream includes a header portion and configuration data. The configuration data is encrypted, while the header portion is not encrypted. Under some circumstances, portions of the header may be well known, or able to be determined. If the header were encoded, this information could lead to discovery of the encryption key. Accordingly, the header is not encrypted. The header portion includes an expected value 906 and a remainder 904. In this example, the portion of the header that is not the expected value 906 is not used.

The encrypted configuration data is received by a function block 910, which performs a function on it. The output 920 is provided to a comparison circuit 930. The comparison circuit compares the expected value 906 to the output on line 922 and makes a determination of validity 940. If the configuration bitstream is invalid, a power supply can be removed from a security RAM, thus erasing its contents.

Figure 10:
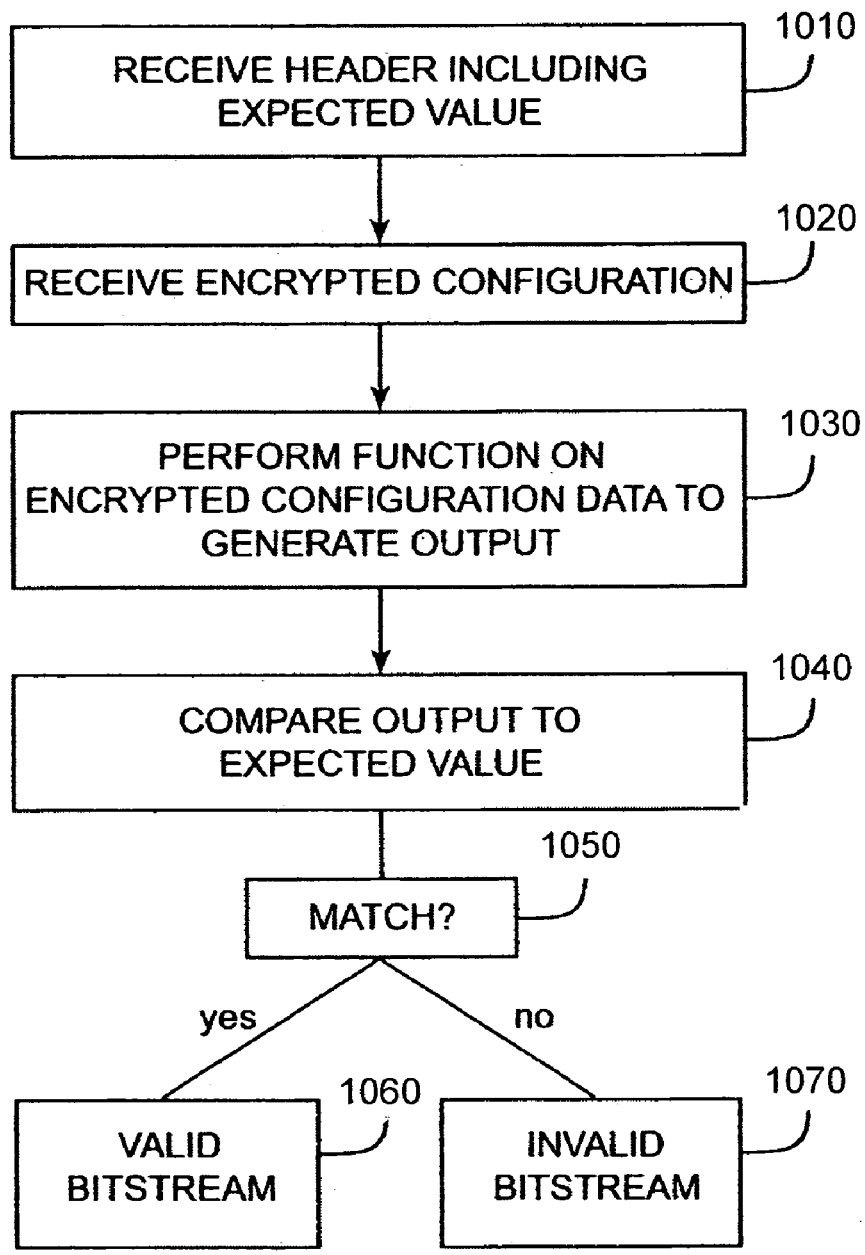
FIG. 10 is a flowchart illustrating a method of generating a configuration bitstream verification signal to control a security RAM shutdown switch according to an embodiment of the present invention.

FIG. 10 is a flowchart illustrating a method of generating a configuration bitstream verification signal to control a security RAM shutdown switch according to an embodiment of the present invention. In step 1010, a header including an expected value is received. In step 1020, encrypted configuration data is received. The header and encrypted configuration data form an encrypted configuration bitstream.

In step 1030, a function is performed on the encrypted configuration data by a function block in order to generate an output. This output is compared to an expected value in step 1040. In step 1050, it is determined whether the expected value received as part of the header matches the output provided by the function block. If there is a match, the bitstream is valid 1060. If there is not a match, the bitstream is invalid 1070.

Figure 11:
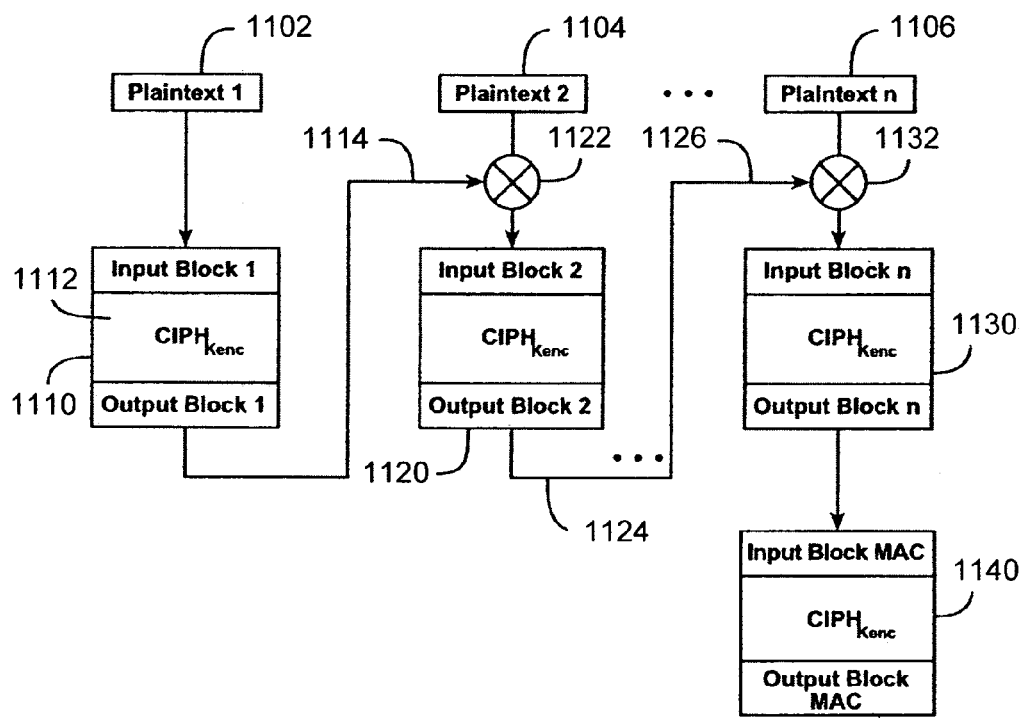
FIG. 11 illustrates a circuit that may be used as the function block in FIG. 9.

FIG. 11 illustrates a circuit that may be used as the function block in FIG. 9. The received configuration data is broken up into plaintext portions 1102, 1104, and 1106. The concatenation of these portions results in reassembling the configuration data. The first portion of the configuration data 1102 is encrypted using a key 1112, thus generating an output on line 1114. The output on line 1114 is exclusive-ORed with the second portion of the configuration data 114 by exclusive-OR circuit 1122. The result on line 1124 passes through a number of similar blocks until a final stage is reached. At this point, the cumulative result on line 1126 is exclusive-ORed with configuration data 1106 by exclusive-OR circuit 1122. The output is encrypted by encryption block 1130 and the result is provided to a final encryption stage 1140. Encryption block 1140 provides an output that may be compared to an expected value that is provided as part of a configuration bitstream header. While the encryption functions 1110, 1120, 1130, and 1140 are shown as separate circuits, in practical integrated circuits, these are one circuit.

In various embodiments of the present invention, data may be stored in a security SRAM as encrypted or unencrypted data, or as a combination thereof. The data may be encrypted using AES, DES, or 3-DES. Alternately, other standard or proprietary encryption algorithms may be used.

Again, the data stored in this security SRAM may include keys used for decryption of encrypted configuration bitstreams or other data encrypted data. Other information, such as chip identification data, and other cryptographic data may be stored.

Also, applications running on an FPGA may use a security SRAM to store data in order to protect it from being lost when power is removed or during an application configuration/reconfiguration process. For example, an application may store data in the security SRAM and protect it with an authentication code that is also stored in the security SRAM and protected from erasure when power is removed. Later, when that application needs to recover its data, for example after a power recycle (that is, where power is removed and then restored, or more particularly, where power drops below a threshold before rising above it), the application can access the data using the authentication code. Data stored in this way is typically stored as unencrypted data, since it is only accessible by an application that knows the authorization code, though this data may be stored as encrypted data as well.

Instead of relying on an authorization code, an application may encrypt data before storing it in the security SRAM. This protects the data since an application that accesses this encrypted data without having the correct decryption key cannot properly decrypt the data.

In the above and other embodiments of the present invention, read and write access to the security SRAM may be controlled by an access control circuit. The access control circuit is typically a hard logic circuit, that is, it is pre-wired, though it various embodiments it may be formed by a number of programmable logic elements. Alternately, some of the access control circuit may be hard logic, while portions may be formed using programmable logic elements. For example, in some embodiments a simple version of the access control circuits may be hard logic, while optional additional circuitry, such as an encoder/decoder circuit, may be formed using programmable logic elements.

Typically, read access is limited, while write accesses are not, though write access may also be limited in various embodiments of the present invention. Read access is typically limited to a lesser degree since the power to the security SRAM can be removed, thereby erasing its contents.

The access control circuit can be used to limit access to data in the security SRAM by applications running in the programmable logic elements or by outside users or applications. Typically however, the access control circuit is either bypassed or automatically allows access by an on-chip configuration controller, though access by this circuit may also be limited. Examples of configuration controllers accessing data in a security SRAM, specifically a decryption key used to decrypt an encrypted bitstream, are shown in the following three figures.

Figure 12:
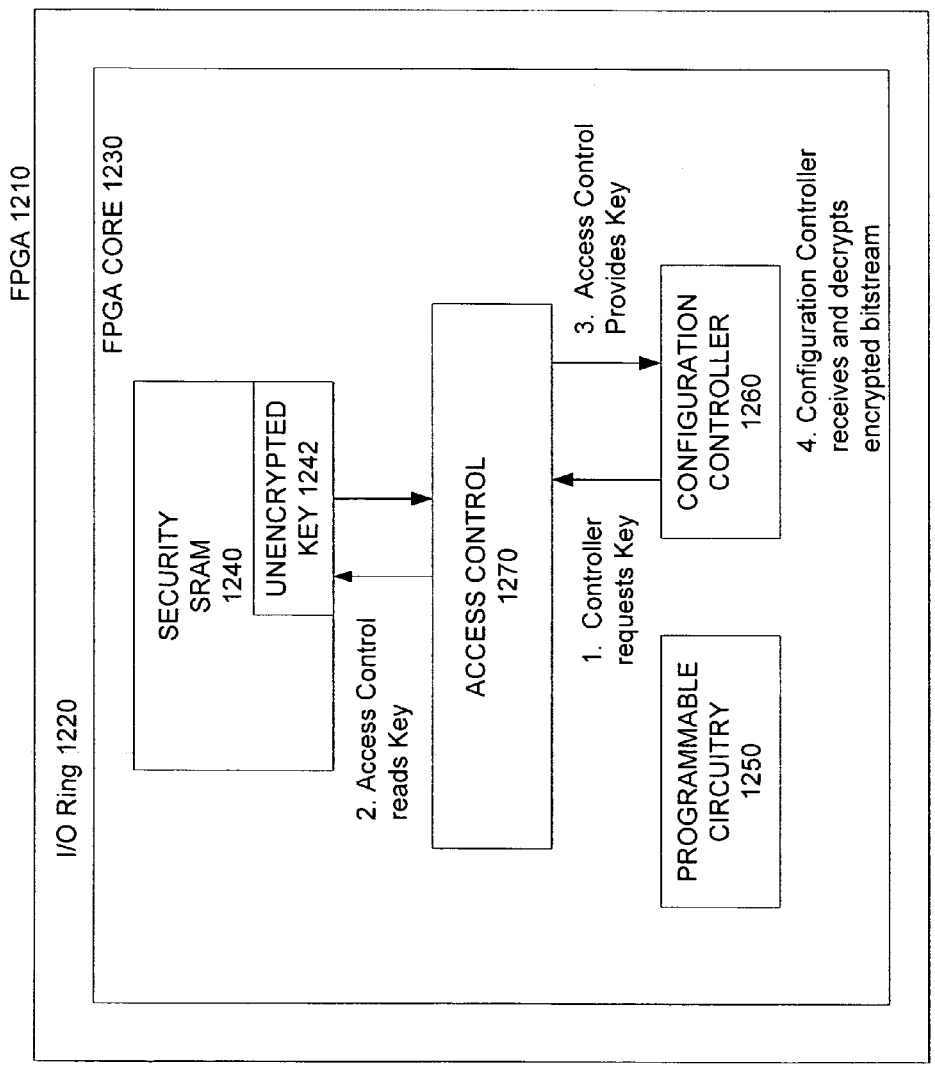
FIG. 12 illustrates exemplary data transfers between a configuration controller, an access control circuit, and security SRAM during the configuration of an FPGA.

FIG. 12 illustrates exemplary data transfers between a configuration controller, an access control circuit, and security SRAM during the configuration of an FPGA. In this example, the key to be used to decrypt the encrypted bitstream, key 1242, is stored as unencrypted data. This figure includes an FPGA 1210 that further includes an I/O ring 1220 and an FPGA core 1230. The FPGA core 1230 includes a security SRAM 1240, programmable logic elements 1250, configuration controller 1260, and access control circuit 1270.

In this example, the configuration controller 1260 requests the key 1242 from the access control circuit. Since the configuration controller 1260 is a known hard logic circuit, the access control circuit 1270 does not require specific authorization from the configuration controller 1260, though in other embodiments of the present invention, such authorization may be required. Accordingly, the access control circuit 1270 reads the key 1242 from the security of SRAM 1240. The access control circuit 1270 then provides the key to the configuration controller 1260. The configuration controller 1260 receives the encrypted configuration bitstream and decrypts the encrypted configuration bitstream. The FPGA is then configured using the decrypted configuration bitstream.

Again, in various embodiments of the present invention, the access control circuit 1270 may limit access to the security SRAM 1240 by the configuration controller 1260. Typically this is not done since the configuration controller 1260 is a hard logic circuit that is pre-wired on the FPGA and not subject to surreptitious reconfiguration. Accordingly, the configuration controller 1260 may either be granted automatic access by the access control circuit 1270, or it may be connected directly to the security SRAM 1240. Flowcharts illustrating these last two methods are shown in the following two figures.

Figure 13A:
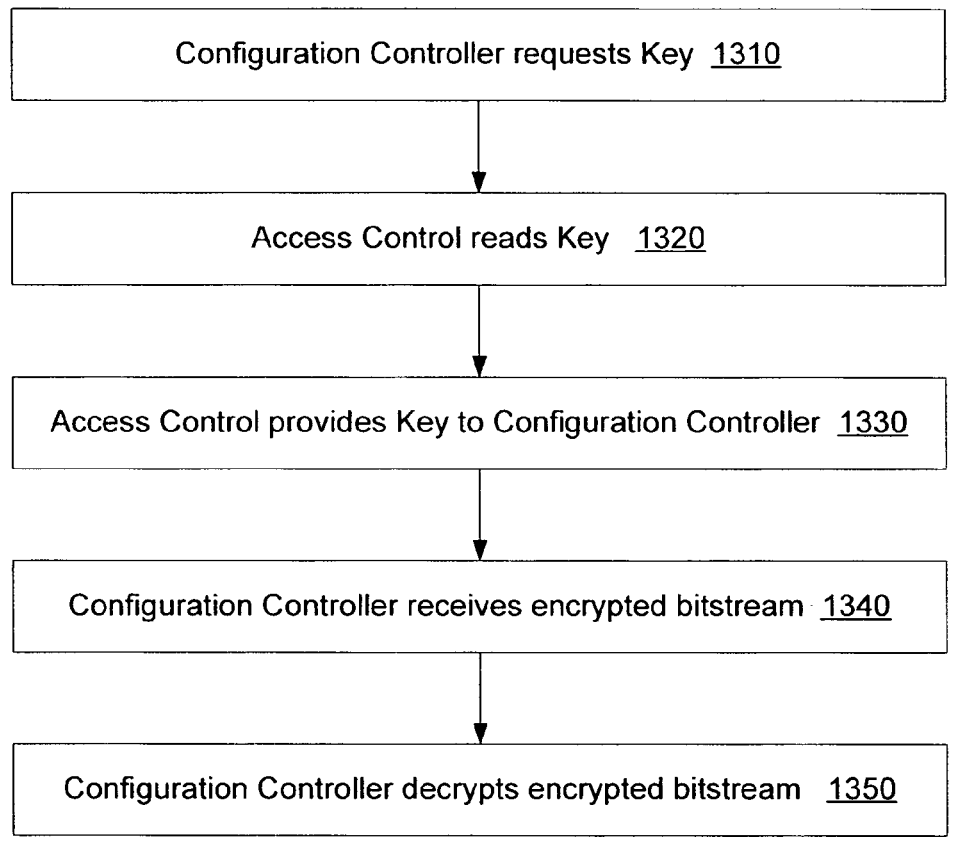
FIGS. 13A and 13B are a flowcharts illustrating the operation of an FPGA where a configuration controller is granted automatic access to a decryption key stored in a security SRAM.

FIG. 13A is a flowchart illustrating the operation of an FPGA where a configuration controller is granted automatic access by an access control circuit to a decryption key stored in a security SRAM.

Specifically, in step 1310, a configuration controller requests a key from an access control circuit. The access control circuit reads the key from a security SRAM in step 1320. The access control circuit provides the key to the configuration controller in step 1330. In step 1340, the configuration controller receives an encrypted bitstream. The configuration controller then decrypts the encrypted bitstream using the key and configures the FPGA.

Figure 13B:
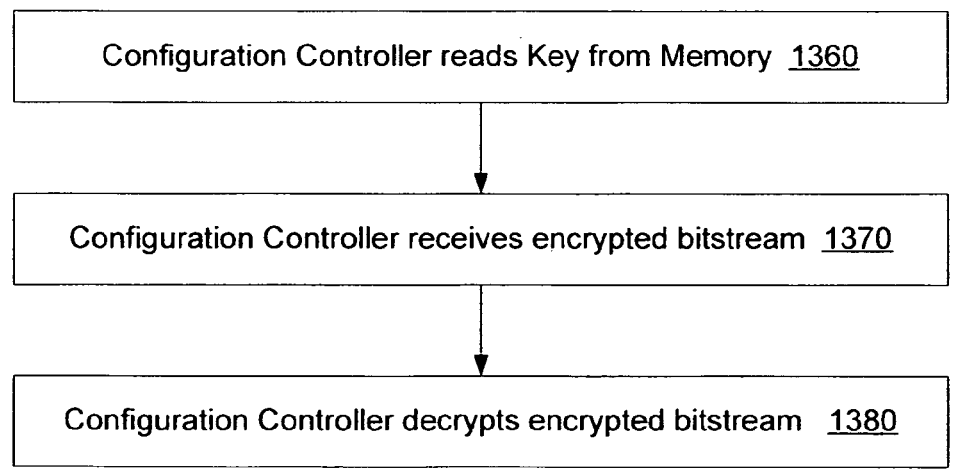

FIG. 13B is a flowchart illustrating the operation of an FPGA where are a configuration controller is directly connected or can bypass the access control circuit. In step 1360, the configuration controller receives a key from the security SRAM. The configuration controller receives an encrypted bitstream in step 1370, and decrypts the bitstream and configures the FPGA in step 1380.

Again, applications running and/or upon configuration/reconfiguration or installation, in the programmable logic circuitry can protect data from erasure by storing it in the battery backed-up security SRAM. The stored data is protected and isolated from external conditions affecting the programmable logic circuitry. For example, if power is removed from the FPGA, the application can recover the data once power is restored. An application may protect this data by encrypting it before storing it in the security SRAM. Alternately, it may store an authorization code in memory along with the data. When the application attempts to recover the data, it provides the location of the data and the authorization code to the access control circuit. If the correct authorization code is given, the access control circuit provides the data to the application. Examples of how this can be implemented are shown in the following two figures.

Figure 14:
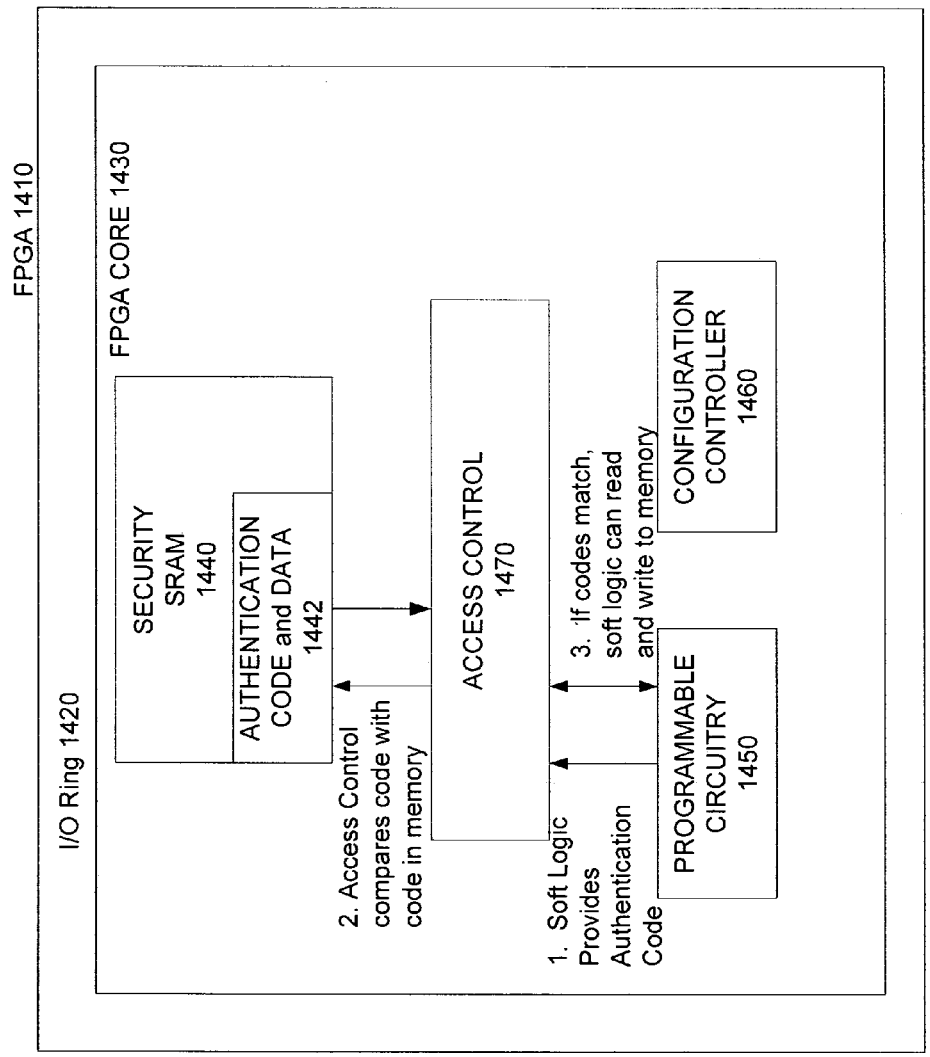
FIG. 14 illustrates exemplary transfers of data in an FPGA where access to data in a memory is limited by requiring an authorization code.

FIG. 14 illustrates exemplary transfers of data in an FPGA where access to data in a memory is limited by requiring an authorization code. This figure includes an FPGA 1410, including an I/O ring 1420 and an FPGA core 1430. The FPGA core 1430 includes a security SRAM 1440, programmable logic elements 1450, configuration controller 1460, and access control circuit 1470.

In this example, an FPGA running in the programmable logic 1450 has previously stored data and a corresponding authorization code 1442 in the security SRAM 1440. To recover this data, any number of methods may be employed to validate access, for example, passwords, etc. In one embodiment, the application provides the address of the data and authorization code to the access control circuit. The access control circuit verifies the authorization code provided by the application. For example, the access control circuit may do a bit-by-bit match, or employ a function associated with the authorization code provided by the application with the authorization code 1442 stored in the security SRAM 1440. If the codes match or function relationship established, the access control circuit allows access to the data by the application. If there is a mismatch, access is denied which may be indicated using a variety of techniques without necessarily returning incorrect data.

Figure 15:
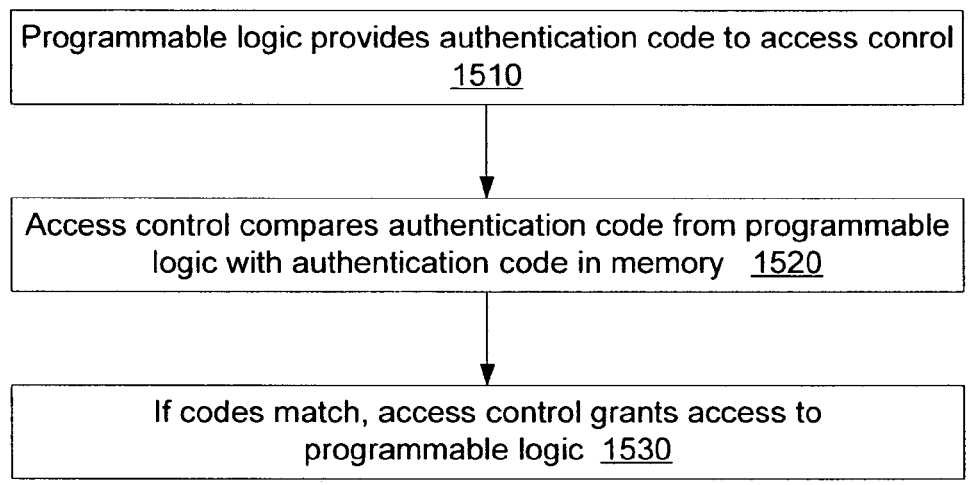
FIG. 15 is a flowchart illustrating a method of limiting read access to data in a security SRAM by requiring an authorization code.

FIG. 15 is a flowchart illustrating a method of limiting read access to data in a security SRAM by requiring an authorization code. In this example, the application has previously stored data and an authorization code in the security SRAM. Again, this write access is typically not limited, though in various embodiments of the present invention this access may be limited as well. For example, the access control circuit may require the authorization code to overwrite data that has been previously protected with the code.

Specifically, in step 1510, an application provides an address for data and an authorization code to an access circuit. In step 1520, the access circuit compares the authorization code with an authorization code stored in the security SRAM. Typically, the authorization code stored in a security SRAM was stored by the application, though other circuits, such as the access control circuit, may generate an authorization code, which is then stored in a security SRAM and given to the application for future use. In step 1530, if the codes match, the access control circuit grants access to the data, otherwise access is denied.

In the above examples, data is typically stored as unencrypted data. However, as discussed above, data may also be stored as encrypted data. For example, a decryption key used to decrypt an encrypted bitstream may itself be encrypted using a second key. This second key may be stored as unencrypted data, or it may be encrypted using yet another key. In the following example, a decryption key is encrypted using a second key, which is stored as unencrypted data.

Figure 16A:
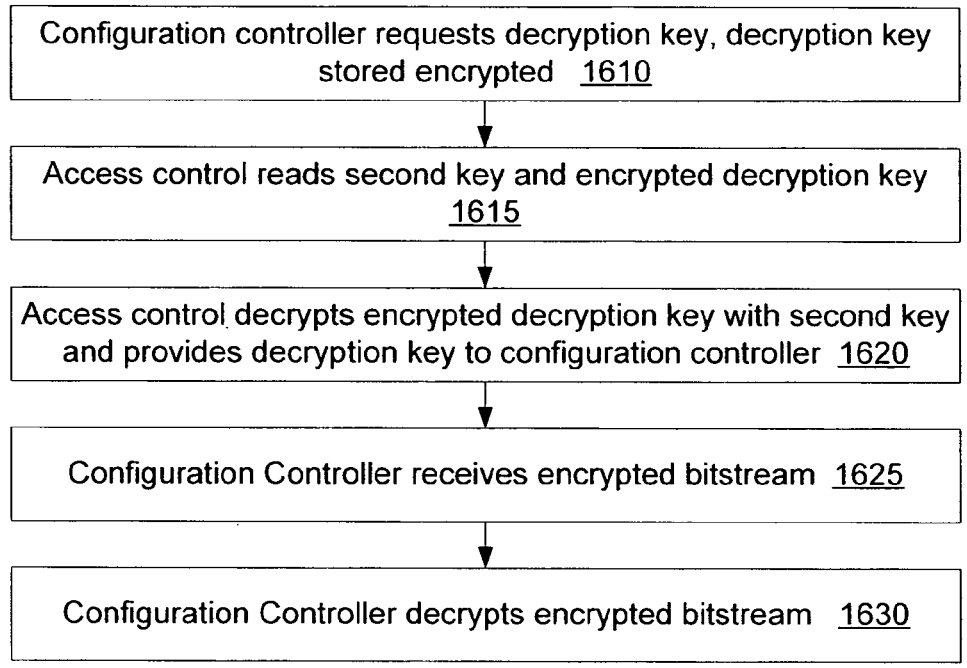
FIGS. 16A and 16B are a flowcharts illustrating a method configuring a device where a decryption key is encrypted using a second key and both keys are stored in a security SRAM.

FIG. 16A is a flowchart illustrating a method of storing decryption keys where a decryption key is encrypted using a second key and both keys are stored in a security SRAM. In this example, an access control circuit is responsible for decrypting the decryption key. This has the advantage as not requiring the configuration controller to know how the decryption key is stored in memory, that is, the configuration controller does not need to know whether the decryption key is stored as encrypted or unencrypted data.

Specifically, in step 1610, a configuration controller requests a decryption key stored in a security SRAM. An access control circuit reads an encrypted decryption key and a second, unencrypted key from the security SRAM in step 1615. In step 1620, the access control circuit decrypts the encrypted decryption key using the second key and provides the decryption key to the configuration controller. In step 1625, the configuration controller receives an encrypted bitstream, and in step 1630, the configuration controller decrypts the encrypted configuration bitstream and configures the FPGA using the decrypted configuration bitstream.

Figure 16B:
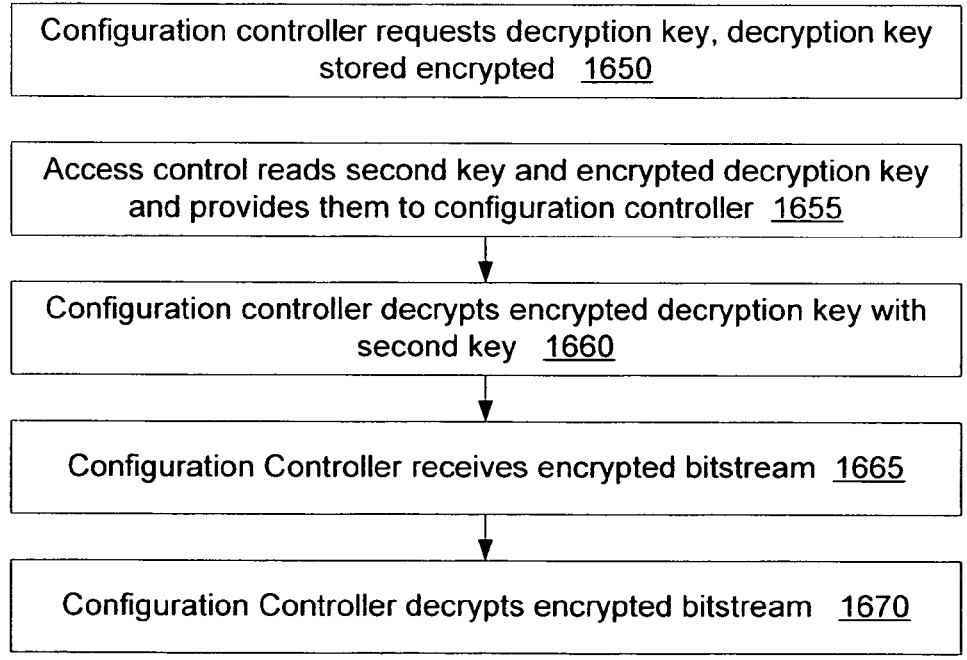

FIG. 16B is another flowchart illustrating a method of storing decryption keys where a decryption key is encrypted using a second key, and both keys are stored in a security SRAM. In this example, the configuration controller is responsible for decrypting the decryption key.

Specifically, in step 1650, the configuration controller requests the decryption key. In step 1655, the access control circuit reads the encrypted decryption key and unencrypted second key from memory and provides them to the configuration controller. The configuration controller decrypts the encrypted decryption key using the second key in step 1660. In step 1665, the configuration controller receives an encrypted configuration bitstream. The encrypted configuration bitstream is decrypted using the decryption key, and in step 1670, the FPGA is configured.

Again, applications may also store encrypted data in the security SRAM. While an authorization code may be required to access this encrypted data, such authorization is typically not required since only an application having the correct decryption key can utilize the data. (Again however, various embodiments of the present invention may require some sort of authorization to overwrite previously written data.) Examples illustrating applications storing encrypted data in a security SRAM are shown in the following three figures.

Figure 17:
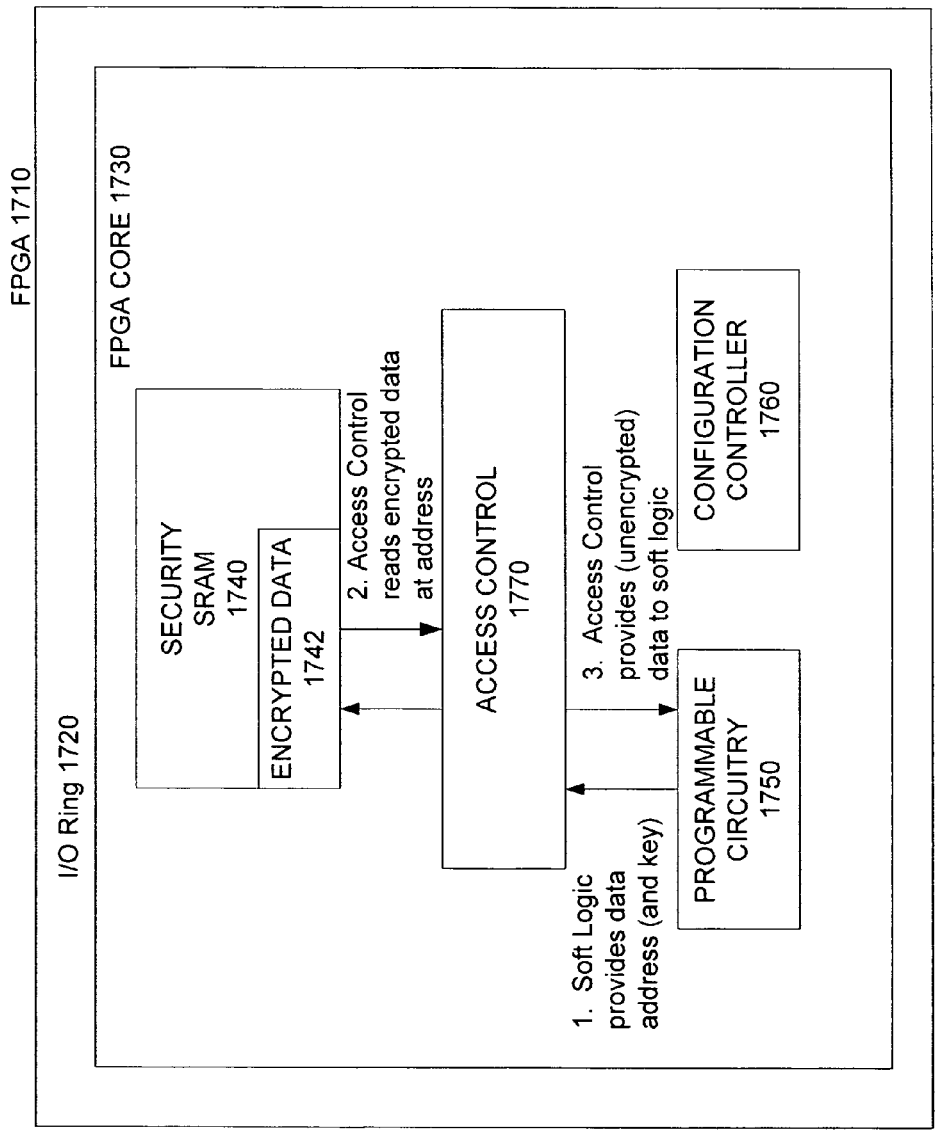
FIG. 17 illustrates an exemplary dataflow in a device where an application has protected data in a security SRAM through encryption.

FIG. 17 illustrates an exemplary dataflow in a device where an application has protected data in a security SRAM through encryption. This figure includes an FPGA 1710 that further includes an I/O ring 1720 and an FPGA core 1730. The FPGA core 1730 includes a security SRAM 1740, programmable logic elements 1750, configuration controller 1760, and access control circuit 1770. In this example, an application running in the programmable logic 1750 has previously stored encrypted data 1742 in the security SRAM 1740, for example before a power recycle, and now the application needs to recover the stored data. The data may have been encrypted by the application itself or by they access control circuit 1770.

The application provides an address for the encrypted data 1742 to the access control circuit 1770. The access control circuit reads the encrypted data 1742 and provides it to the application. The application then decrypts the data using its key. Only an application having the correct key can make use of the encrypted data, otherwise the data is useless.

While in this embodiment the decryption is done by the application itself, in other embodiments the decryption may be done by the access control circuit. For example, this may be useful where the access control circuit encrypts data using a key, and then provides the key to the application for further use. Examples are shown in the following flowcharts.

Figure 18A:
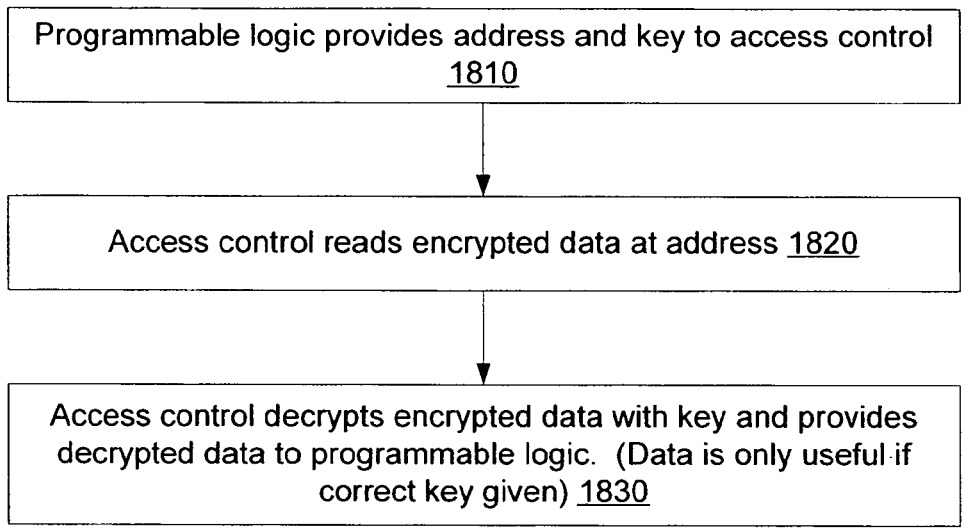
FIGS. 18A and 18B are a flowcharts illustrating a method of receiving and decrypting encrypted data stored in a security SRAM.

FIG. 18A is a flowchart illustrating a method of receiving encrypted data stored in a security SRAM. In this example, an access control circuit decrypts data for an application. The encrypted data may have been originally encrypted by either the application or the access control circuit, depending on the exact implementation.

Specifically, in step 1810, an application provides an address of encrypted data and the key to the access control circuit. In step 1820, the access control circuit reads the encrypted data from the security SRAM. In step 1830, the access control circuit decrypts the encrypted data and provides the decrypted data to the application. Again, this data is useful only if the correct key was given to the access control circuit by the application.

Figure 18B:
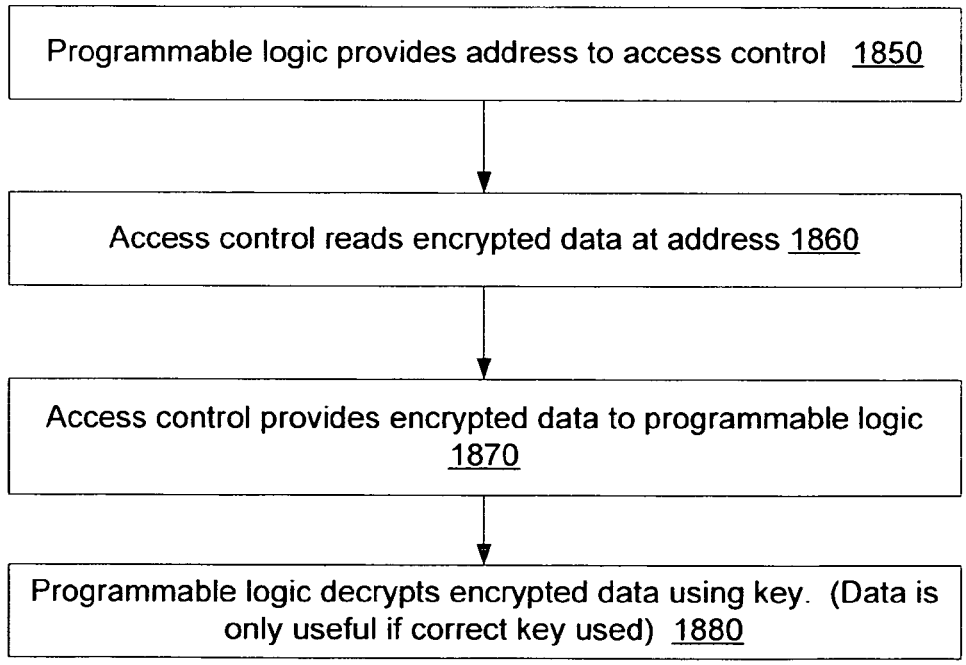

FIG. 18B is another flowchart illustrating a method of receiving encrypted in data stored in a security SRAM. In this example, the application itself is responsible for decrypting data.

Specifically, in step 1850, the application gives an address for the encrypted data to the access control circuit. In step 1860, the access control circuit reads the encrypted data from a security SRAM. In step 1870, the access control circuit provides the encrypted data to the application. The application decrypts the data using its key in step 1880. Again, this data is only useful if the application uses the correct decryption key.

In one embodiment, for flexible use the security SRAM may be partitioned with no access control, partitioned to include an access control area plus a data storage area where the data storage area may be further partitioned into protected areas. To further protect the data stored in security SRAM, is by write protecting the access control section. There are a plurality of write protection schemes that may be employed such as one-time write where once a memory location has been written to it cannot be overwritten.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. An integrated circuit comprising:
   a first power supply terminal to receive a first power supply voltage provided by a battery;
   a second power supply terminal to receive a second power supply voltage;
   a random access memory to store data and coupled to the first supply terminal;
   a plurality of programmable logic elements configurable to implement user-defined logic functions and coupled to the second power supply terminal;
   a configuration controller coupled to receive a configuration bitstream, and further coupled to configure the plurality of programmable logic elements using the configuration bitstream; and
   an access controller coupled between the random access memory and the plurality of logic elements and the configuration controller to control read access of the data by the plurality of logic elements and the configuration controller.

2. The integrated circuit of claim 1, further comprising a power supply switch coupled between the first power supply terminal and the random access memory, where the power supply switch selectively connects the first power supply to the random access memory.

3. The integrated circuit of claim 2, wherein the power supply switch is further coupled to the second power supply terminal, and the power supply switch provides the second power supply voltage to the random access memory when the second power supply voltage is above a first threshold.

4. The integrated circuit of claim 3, wherein the power supply switch disconnects the first power supply from the random access memory when a tamper is detected.

5. The integrated circuit of claim 3, further comprising a message authentication code to verify the configuration bitstream, and to disconnect the first power supply from the random access memory if the configuration bitstream is not verified.

6. The integrated circuit of claim 1, wherein the access controller receives an authorization code from the plurality of programmable logic elements, compares it to an authorization code stored in the random access memory, and provides the data to the plurality of programmable logic elements if they match.

7. The integrated circuit of claim 1, wherein the access controller provides the data to the plurality of programmable logic elements when a function relationship between an authorization code received from the plurality of programmable logic elements and authorization code stored in the random access memory is met.

8. The integrated circuit of claim 1, wherein one or more of the random access memory, the configuration controller, the plurality of programmable logic elements, the access controller, or the power supply switch are formed on a field programmable gate array.

9. The integrated circuit of claim 1 wherein the random access memory comprises a volatile random access memory.

10. A method of controlling access to a random access memory comprising:
    generating data and a first authorization code using a plurality of programmable logic elements;
    providing an address, the data, and the first authorization code to an access control circuit;
    writing the data at the address in a random access memory powered by a battery;

writing the first authorization code to the random access memory;
providing the address and a second authorization code to the access control unit;
reading the first authorization code from the random access memory;
comparing the first authorization code and the second authorization code using the access control circuit; and
if the first authorization code matches the second authorization code, then reading the data at the address from the random access memory; and
providing the data to the plurality of programmable logic elements, else
not providing the data to the plurality of programmable logic elements.

11. The method of claim 10, wherein providing the data comprises providing the data when a function relationship between the first authorization code and the second authorization code is met.

12. The method of claim 10, wherein not providing the data comprises altering the data to prevent user determination whether the data was provided or not provided to the plurality of programmable logic elements.

13. The method of claim 10, wherein the plurality of programmable logic elements is powered by a first power supply and the first power supply is recycled after the data and the first authorization code is written to the random access memory but before the second authorization code is provided to the access control unit.

14. The method of claim 10, wherein the battery powers the random access memory through a power supply switch, wherein the power supply switch connects or disconnects the battery to the random access memory.

15. The method of claim 10, further comprising:
detecting a tamper; and
disconnecting the battery from the random access memory.

16. The method of claim 10, further comprising:
receiving an encrypted configuration bitstream with a configuration controller;
receiving a key stored in the random access memory;
decrypting the encrypted configuration bitstream using the key;
using a message authentication code to determine whether the configuration bitstream is valid; and
if the second configuration bitstream is invalid, then disconnecting the battery from the random access memory.

17. The method of claim 10 wherein writing the data at the address in a random access memory comprises writing the data at the address in a volatile random access memory.

18. A method of protecting data stored in a random access memory comprising:
generating the data and a first key using a plurality of programmable logic elements;
encrypting the data using the first key;
providing an address and the encrypted data to an access control circuit;
writing the encrypted data at the address in a random access memory powered by a battery;
providing the address to the access control unit a second time;
reading the encrypted data from the random access memory; and
decrypting the encrypted data with the first key using the plurality of programmable logic elements.

19. The method of claim 18, wherein the plurality of programmable logic elements is powered by a first power supply and the first power supply is recycled after the encrypted data is written to the random access memory and before the address is provided to the access control unit a second time.

20. The method of claim 18, wherein the random access memory is a volatile memory.

21. The method of claim 18, wherein the battery powers the random access memory through a power supply switch, wherein the power supply switch connects or disconnects the battery to the random access memory.

22. The method of claim 18, further comprising:
detecting a tamper; and
disconnecting the battery from the random access memory.

23. The method of claim 18, further comprising:
receiving an encrypted configuration bitstream with a configuration controller;
receiving a second key stored in the random access memory;
decrypting the encrypted configuration bitstream using the second key;
using a message authentication code to determine whether the configuration bitstream is valid; and
if the second configuration bitstream is invalid, then disconnecting the battery from the random access memory.

* * * * *